March 21, 1933.   N. S. SMITH   1,901,993
CULTIVATOR TRACTOR
Filed July 22, 1930   2 Sheets-Sheet 1

Fig. 1.

Inventor
N. S. Smith
By Clarence A. O'Brien
Attorney

March 21, 1933. N. S. SMITH 1,901,993
CULTIVATOR TRACTOR
Filed July 22, 1930 2 Sheets-Sheet 2
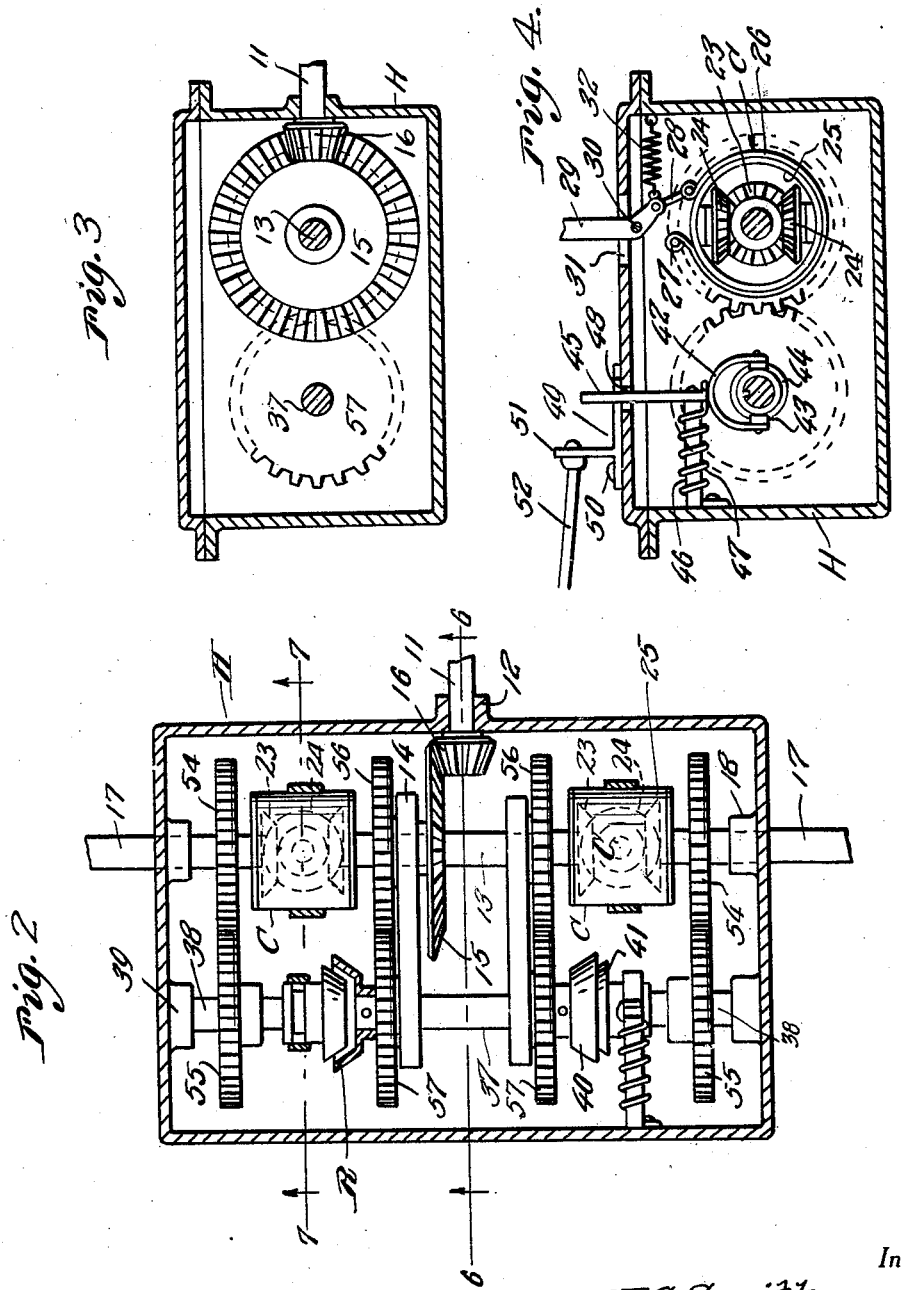

Patented Mar. 21, 1933

1,901,993

UNITED STATES PATENT OFFICE

NORMAN S. SMITH, OF EASTABOGA, ALABAMA

CULTIVATOR TRACTOR

Application filed July 22, 1930. Serial No. 469,741.

This invention relates to certain new and novel improvements in cultivators, and the primary object of this invention is to provide what may be termed a cultivator-tractor.

With the above and numerous other objects in view and as will become more apparent as the description proceeds, the invention consists in the novel combination, arrangement of parts and details of construction hereinafter more fully set forth, shown in the accompanying drawings, and claimed.

In the drawings:

Figure 1 is a top plan view of the cultivator tractor,

Figure 2 is a sectional view taken through the transmission housing,

Figures 3 and 4 are transverse sectional views taken substantially on the lines 6—6 and 7—7 respectively of Figure 2, With reference more in detail to the drawings it will be seen that the reference character F designates generally a frame. Extending transversely of the frame F at the forward end thereof is an axle 6 that has conventional type of tractor wheels 5 on the outer ends thereof for supporting the frame of the tractor. The rear end of the frame is supported through the medium of a pair of wheels 7, each of which is rotatably supported in a suitable fork 8, the upper end of which is swivelly secured as at 9 to the rear end of the longitudinal side frame members 10 of the frame F.

Suitably mounted on the forward end of the frame is a conventional type of internal combustion engine E that includes among other parts a crank shaft 11. The rear end of the crank shaft 11 extends rearwardly and projects into a transmission housing H that is suitably supported on the frame F rearwardly of the internal combustion engine. The last referred to end of the crank shaft 11 is journalled in a suitable bearing 12 formed on one side wall of the housing H.

Arranged in the transmission housing H is a suitable transmission mechanism and includes a sectional drive shaft including a main section 13 supported in suitable bearings 14. The section 13 has a relatively large bevel gear 15 keyed thereto and in mesh with a relatively small bevel gear 16 on the inner end of crank shaft 11. End shaft sections 17 are journalled in suitable bearings 18 and the outer ends of the sections 17 project outwardly of the housing H. On the outer end of each of the sections 17 is a sprocket 19. Suitably secured to each of the tractor wheels 5 as at 20 is a relatively large sprocket 21.

Endless drive chains 22 are trained over sprockets 19 and 21.

The inner ends of the shaft sections 17 are operatively connected with the ends of the shaft section 13 through the medium of differential planetary mechanisms designated generally by the reference character C. The mechanisms C are somewhat of conventional construction including the usual bevel gears 23 carried by the shaft sections 13 and 17 and the spider gears 24 carried by a drum 25. Circumjacent the drum 25 is a brake band 26. One end of the brake band 26 is anchored as at 27. The other end of the band 26 has a link connection 28 with the inner end of a lever 29 pivotally mounted as at 30.

The brake lever 29 operates in slot 31 formed in the top of the housing H. Springs 32 are secured at one end to the inner ends of the levers 29 and at their opposite ends are suitably anchored within the housing H for normally retaining the brake bands 26 loose about the drums 25.

As shown in dotted lines in Fig. 2, the ends of the sections 13 extend into the housings 25 and the inner ends of the sections 17 extend into these housings and in each housing is a pair of beveled gears 23, one of which is connected to a section or shaft 17 and the other to a shaft or section 13. A pair of pinions 24 is rotatably arranged in each housing, and these pinions engage the two beveled gears 23. Thus when the brake band 26 is contracted, the housing will be held against rotary movement so that the pinions 24 communicate the movement of the shaft or section 13 to the sections or shafts 17 and this movement of the shafts 17 is communicated to the drive wheels 5 by the chains 22 and the sprockets 19 and 21. When the brake band 26 is loose, the housing is permitted to rotate and thus the pinions 24 simply travel around on the bevelled gears 23 without imparting motion to the shafts or sections 17 from the shaft or section 13.

The mechanisms C are controlled by the operator of the machine seated upon a seat S mounted at the rear end of the frame and supported on the frame through the medium of a suitable support 33.

Suitably supported on the frame F at the rear end of the frame and extending transversely of the frame is a rock shaft 34. Mounted on the rock shaft 34 is a pair of control levers 35, one for each brake lever 29. The control levers 35 are operatively connected to the levers 29 through the medium of suitable links 36.

The transmission mechanism further comprehends the provision of a sectional lay shaft that includes a main shaft section 37 suitably journalled in bearings 14, and two end sections 38. Each end shaft section 38 at one end thereof is journalled in a suitable bearing 39 provided therefor on the end wall of the housing H. The shaft sections 38 are operatively connected with the shaft section 37 through the medium of suitable clutch mechanisms designated generally by the reference character R. Each clutch mechanism R includes a conical shaped female clutch member 40 keyed to the shaft section 37 in any suitable manner, together with a conical male clutch section 41 slidably mounted on the inner free end of a shaft section 38 for movement into and out of engagement with the female section 40.

Each of the clutch sections R further include a fork member 42, the legs of which are provided with lugs 43 operable in an annular groove 44 formed on the hub of the male clutch member 41. The shank 45 of the fork is pivoted to the outer end of an arm 46 rigidly supported in the housing H. Convoluted about the arm 46 is a spring 47 one end of which bears against the lower end of the shank 45 for normally retaining its male clutch member 41 out of engagement with its complemental female clutch member 40.

Shanks 45 of the forks 42 operate in suitable slots 48 provided therefor in top of the housing H. The forks 42 are locked against the action of the springs 47 for moving the male clutch members 41 into engagement with the female clutch members 40 through the medium of actuating arms 49 pivoted as at 50 to the top wall of the housing H. Each of the arms 49 include an upstanding lug 51 to which is suitably secured one end of a link 52 that is connected at its opposite end to a suitable control lever 53 mounted on the rock shaft 34.

The driving shaft sections 17 have keyed thereto gears 54 for mesh with the gear wheels 55 keyed to the driven shaft sections 38. The main drive shaft section 13 has adjacent each end thereof a gear wheel 56 that meshes with a gear 57 keyed to the main driven shaft section 37 adjacent each of the shaft sections 38.

From the foregoing then it will be apparent that I have provided a simple type of transmission mechanism for providing a forward and reverse drive for the tractor cultivator and that by suitably controlling the mechanism C and clutchs R such transmission mechanism is utilized to advantage for steering purposes, that is, in making right and left hand turns in a manner apparent.

For example when the brake bands are contracted around the members C, both of the sections 17 are rotated at the same speed from the section 13 and thus the vehicle will travel in a straight line. If it is desired to make a turn, one of the brake bands is loosened so that the section 17 connected with this member will be rotated at a less speed than the other section 17, and thus one of the ground wheels 5 may be rotating at a greater speed than the other ground wheel, so that the vehicle will make a turn in the direction of the wheel which is rotating at less speed. Of course if the brake band is wholly loosened then the shaft 17 would stop rotating and the turn would be made faster, and in this case the ground wheel connected with the shaft 17 which is wholly disconnected from the section 13 will simply idle due to its contact with the ground. As the vehicle is being reversed, and moved backwardly in a straight line, both brake bands are loose from the housings and both of the clutches R are thrown into operation so that the section or shaft 13 will drive the section 37 which in turn drives the section 38, and these sections 38 being connected by the gears 54 and 55 to the sections 17 which will rotate said section at the first speed and thus move the ground wheels in a reverse direction so as to reverse the movement of the tractor.

By moving one of the clutches R to released position, or partly released position, one of the ground wheels will be driven at a slower speed in reverse than the other, or permitted to idle, so that a turn can be made in reverse.

Extending rearwardly from the forward axle 6 of the device is a pair of plow beams 58 which are movably connected to the axle in any suitable manner. The rear portions of the beams 58 terminate in angular terminals 62 and to the terminals 62 are suitably clamped gangs of plows 63. The plows 63 or other type of ground working implement may be clamped to the terminals 62 as at 64. The angular terminals 62 of the beam 58 are connected together through the medium of an arched connecting bar 65. Said terminals 62 are connected to the ends of the arch bar through the medium of suitable U-bolts 66.

Journalled in bearings 67 provided adjacent the rear ends of the frame bars 10 is a shaft 68. The shaft 68 adjacent each end thereof is provided with a crank arm 69, there being one crank arm 69 for each beam 58. The crank arms 69 are operatively connected to the rear free ends 62 of the beams 58 through the medium of links 70. Carried by the rock shaft 68 adjacent one end thereof is an operating lever 71 that is equipped with a detent structure 72 for cooperation with a rack segment 73 suitably supported on the frame F for retaining the lever 71 in any predetermined position. Obviously by rocking the lever 71, the free ends 62 of the beams 58 may be moved toward or away from the ground for controlling the digging depth of the earth working implements or plows 63.

Even though I have herein shown and described the preferred embodiments of my invention, it is to be understood that the same is susceptible to changes fully comprehended by the spirit of the invention as herein described, and the scope of the appended claims.

Having thus described my invention, what I claim as new is:

1. In a device of the character described, the combination of a transmission mechanism including a sectional drive shaft and a sectional lay shaft, differential planetary mechanisms connecting the sections of the drive shaft, clutch mechanisms connecting the sections of the lay shaft, a rock shaft, each of the first-named mechanisms including a lever, means operatively connecting said lever with said rock shaft, each of said second-mentioned mechanisms including a control lever, and means operatively connecting said last-mentioned lever with said rock shaft, and gearing located on either side of said differential and clutch mechanisms for connecting the sections of the drive shaft with the corresponding sections of the lay shaft.

2. A device of the character described, and in combination, a transmission mechanism including a sectional drive shaft, a sectional lay shaft, gearing connecting the sections of the drive shaft with the corresponding sections of the lay shaft, differential planetary mechanisms connecting the sections of the drive shaft, clutch mechanisms connecting the sections of the lay shaft, and means for independently controlling each of said mechanisms and said gearing being located on either side of the said differential and clutch mechanisms.

In testimony whereof I affix my signature.

NORMAN S. SMITH.